US006977674B2

(12) United States Patent
Seo

(10) Patent No.: US 6,977,674 B2
(45) Date of Patent: Dec. 20, 2005

(54) STEREO-IMAGE CAPTURING DEVICE

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 647 days.

(21) Appl. No.: 10/145,029

(22) Filed: May 15, 2002

(65) Prior Publication Data

US 2002/0171740 A1 Nov. 21, 2002

(30) Foreign Application Priority Data

May 21, 2001 (JP) .......................... P2001-150366

(51) Int. Cl.[7] ...................... H04N 5/225; H04N 13/00; H04N 3/14
(52) U.S. Cl. ................... 348/207.99; 348/42; 348/280
(58) Field of Search ............................. 348/42, 45, 51, 348/207.99, 218.1, 219.1, 270, 271, 273, 348/280

(56) References Cited

U.S. PATENT DOCUMENTS

| 4,345,269 | A | * | 8/1982 | Takemura | .................. | 348/280 |
|-----------|---|---|--------|-------------|-------------------|---------|
| 4,786,964 | A | * | 11/1988 | Plummer et al. | ........... | 348/270 |
| 4,967,264 | A | * | 10/1990 | Parulski et al. | ............. | 348/271 |
| 6,233,003 | B1 |  | 5/2001 | Ono |  |  |
| 6,704,043 | B2 | * | 3/2004 | Goldstein et al. | ............. | 348/45 |
| 6,807,295 | B1 | * | 10/2004 | Ono | ........................... | 348/42 |
| 6,833,873 | B1 | * | 12/2004 | Suda | ........................ | 348/280 |

FOREIGN PATENT DOCUMENTS

| JP | 49-87223 | 8/1974 |
|----|----------|--------|
| JP | 10-42314 | 2/1998 |

OTHER PUBLICATIONS

"Single Lens Stereo with a Plenoptic Camera", by Adelson and Wang, IEEE Transactions on Pattern Analysis and Machine Intelligence, vol. 14, No. 2, pp. 99-106, Feb. 1992.

* cited by examiner

Primary Examiner—Thai Tran
Assistant Examiner—Luong T. Nguyen
(74) Attorney, Agent, or Firm—Greenblum & Bernstein, P.L.C.

(57) ABSTRACT

A stereo-image capturing device includes an on-chip color filter attached CCD, a photographing optical system, and an aperture disk. The on-chip color filter includes red (R), green (G), and blue (B) color filters, so that the CCD senses images in R, G, and B colors. The photographing optical system produces R, G, and B color images of a subject on the imaging surface of the CCD. The aperture disk has three apertures with R, G, and B color filters.

13 Claims, 5 Drawing Sheets

STEREO-IMAGE CAPTURING DEVICE

BACKGROUND OF THE INVENTION

1. Field of the Invention

The present invention relates to a stereo-image capturing device that captures images for stereo vision.

2. Description of the Related Art

Stereo vision utilizing a pair of perspective images of a subject is well known in the field of photogrammetric or computer vision engineering. In the stereo vision system, images are taken at different positions so that each of the images has parallax to one another. In the following description, each image for the stereo vision system will be referred to as a parallax image.

There are several methods for capturing parallax images. For example, parallax images may be captured simultaneously by a plurality of cameras or the images may be captured in turn by displacing the position of a single camera. A method for capturing parallax images by a single lens system without displacing the camera position is disclosed in the unexamined Japanese patent publication No. H10-42314. This method uses the principle that when a position of a pinhole is displaced from one place to another on a plane perpendicular to the optical axis, the subject images produced on the imaging surface through the pinhole before and after the displacement have parallax between one another. Namely, a position changeable aperture is utilized in the method. The position of the aperture (pinhole) is displaceable on a plane perpendicular to the optical axis. The position of the aperture is displaced and an image of the subject is captured at each position, so that the parallax images of the subject are obtained. Therefore, by this method, the parallax images can be obtained by using a single lens system and a plurality of cameras or a position changing of a camera is not required. However, the method requires time for capturing the parallax images since each of the parallax images is taken in sequence while moving the position of the aperture.

SUMMARY OF THE INVENTION

An object of the present invention is to provide a stereo-image capturing device that is able to capture parallax images simultaneously by a single lens system with a simple mechanism.

According to the present invention, a stereo-image capturing device is provided that comprises an image-sensing system, a photographing optical system, and an aperture member.

The image-sensing system is able to sense a first subject image produced of light beams in a first spectrum and a second subject image produced of light beams in a second spectrum. The photographing optical system produces the first and second subject images in the image-sensing system. The aperture member comprises first and second apertures. The first aperture is applied with a first optical filter which selectively transmits light beams of the first spectrum. The second aperture is applied with a second optical filter which selectively transmits light beams of the second spectrum.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
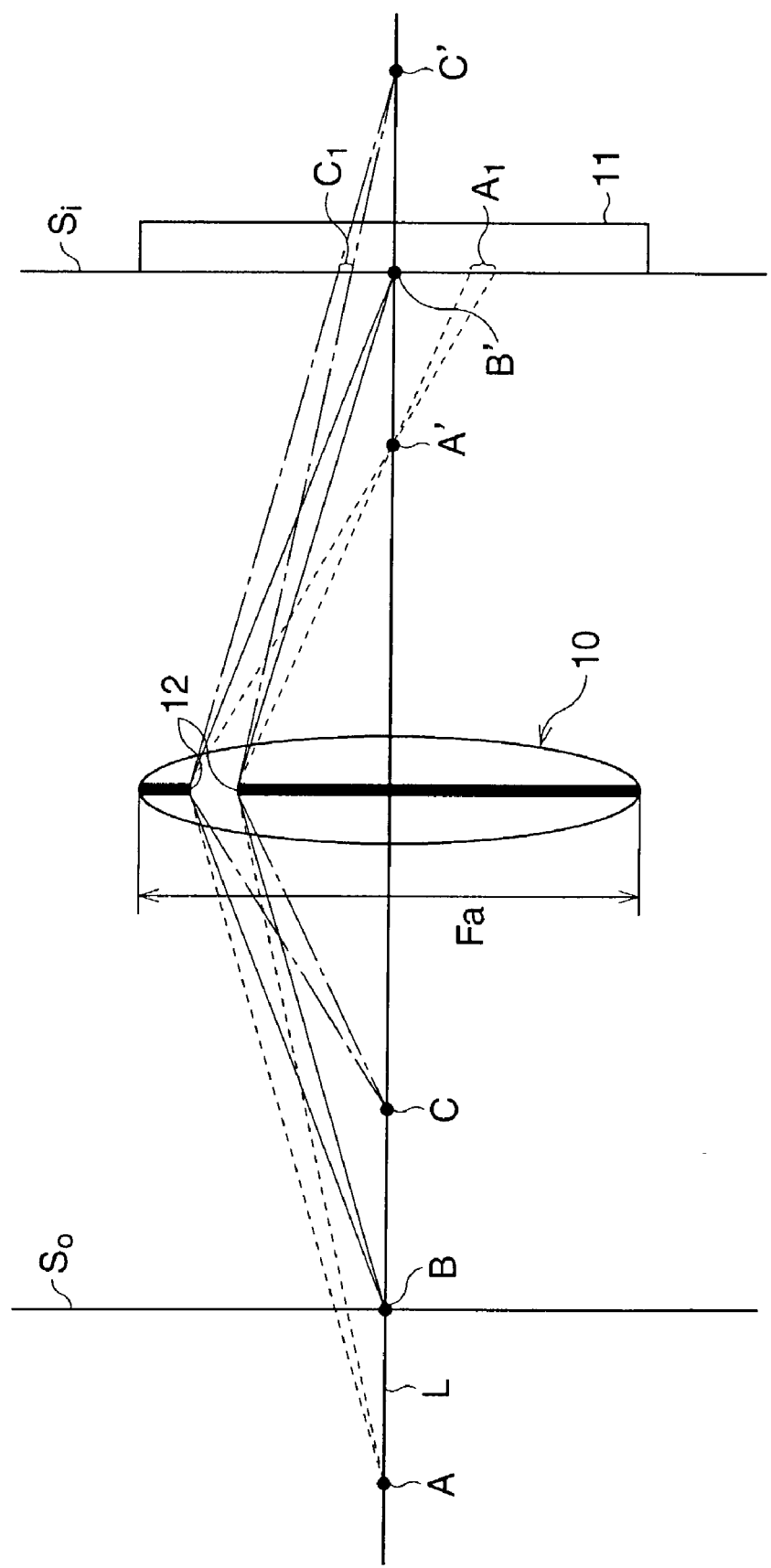
FIGS. 1 and 2 schematically illustrate the parallax image capturing principle which is applied in the stereo-image capturing device of the present embodiments.

The present invention is described below with reference to the embodiments shown in the drawings.

With reference to FIG. 1 through FIG. 4, the stereo-image capturing device of the first embodiment is explained.

Figure 2:
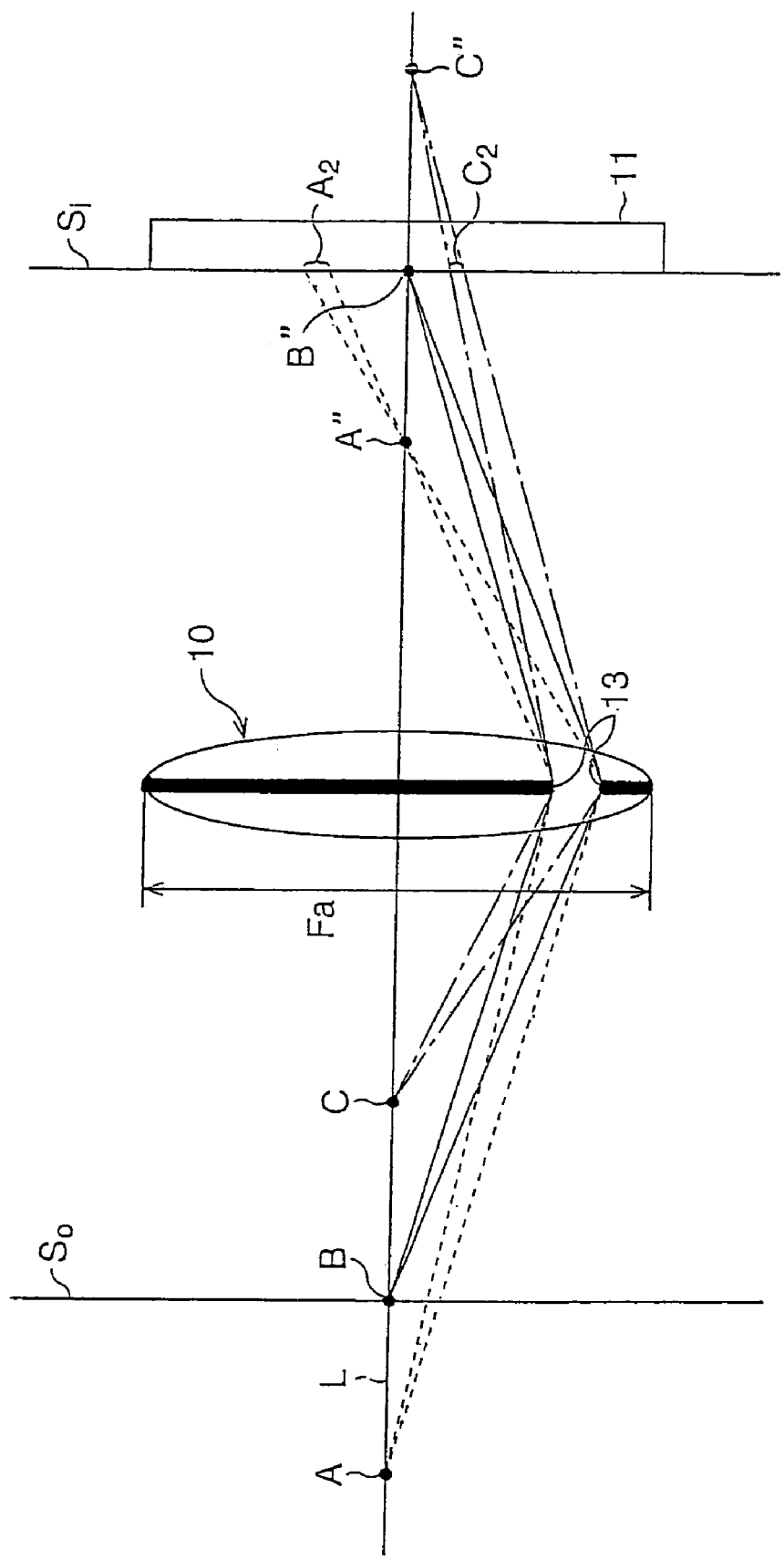

At first, the parallax images capturing principle of the present embodiment is explained with reference to FIGS. 1 and 2. FIGS. 1 and 2 schematically illustrate the photographing lens system 10. In FIG. 1, the subject image is projected and formed on the imaging surface $S_i$ of the imaging device 11 through the aperture 12 which is located above the optical axis L. In FIG. 2, the subject image is projected and formed on the imaging surface $S_i$ of the imaging device 11 through the aperture 13 which is located below the optical axis L. Note that, the thick solid lines block off the light made incident to the photographing lens system 10 and Fa indicates the fully-open aperture value.

In FIGS. 1 and 2, three object points A, B, and C on the optical line L and the position of their images projected on the imaging surface $S_i$ are indicated. The object point B is on the in-focus plane $S_0$ to which the imaging surface $S_i$ is focused on with the photographing lens system 10. The object point A indicates a point farther than the in-focus plane $S_0$ and the object point C indicates a point nearer than the in-focus plane $S_0$. Therefore, each of the object points A, B, and C focuses into the image at the image points A', B', and C' through the aperture 12. The image point A' is in front of the imaging surface $S_i$, the image point B' is just on the imaging surface $S_i$, and the image point C' is at the rear of the imaging surface $S_i$. Further, each of the object points A, B, and C focuses into the image at the image points A", B", and C" through the aperture 13. The image point A" is in front of the imaging surface $S_i$, the image point B" is just on the imaging surface $S_i$, and the image point C" is at the rear of the imaging surface $S_i$. Namely, the image of the object point A is projected to the area $A_1$ of the imaging surface $S_i$ via the aperture 12, an area which is disposed below the optical axis L. The image of the object point B is projected to the image point B' on the imaging surface $S_i$ via the aperture 12, a point which is on the optical axis L. The image of the object point C is projected to the area $C_1$ of the imaging surface $S_i$ via the aperture 12, an area which is disposed above the optical axis L. Further, similar to FIG. 1, the image of the object point A is projected to the area $A_2$ of the imaging surface $S_i$ via the aperture 13, an area which is disposed above the optical axis L. The image of the object point B is projected to the image point B' on the imaging surface $S_i$ via the aperture 13. The image of the object point C is projected to the area $C_2$ of the imaging surface $S_i$ via the aperture 13, an area which is disposed below the optical axis L. Note that, the apertures 12 and 13 are set to a size so that the areas A1, A2, C1, and C2 are small enough for the unsharpness of the images of the object points A and C on the imaging surface $S_i$ to be considered negligible.

The position of the image on the imaging surface $S_i$ that corresponds to an object point on the in-focus plane $S_0$ is independent of the position of the aperture. However, when the object point is out of the in-focus plane $S_0$, the position of the object image on the imaging surface $S_i$ varies as to the position of the aperture. The extent of this variation becomes larger as the object gets farther away from the in-focus plane $S_0$. When the object point is disposed at a point closer than the in-focus plane $S_0$, the position of the object image on the imaging surface $S_i$ varies in the direction of the displacement of the aperture. On the other hand, when the object point is disposed at the point farther than the in-focus plane, the position of the object image on the imaging surface $S_i$ varies in the opposite direction of the displacement of the aperture. For example, when the aperture is displaced downward, from the position of the aperture 12 of FIG. 1 to the position of the aperture 13 of FIG. 2, the position of the object image of the object point C (which is closer than the in-focus plane $S_0$) is displaced downward from the area $C_1$ (which is above the optical axis L) to the area $C_2$ (which is below the optical axis L). On the other hand, the position of the object image of the object point A (which is farther than the in-focus plane $S_0$) is displaced upward from the area $A_1$ (which is below the optical axis L) to the area $A_2$ (which is above the optical axis L).

Therefore, a pair of subject images projected through two separate apertures has a gap that relates to the distance from the photographing system to the subject. The gap corresponds to the parallax which can be obtained by taking the subject images from the two different view points. Namely, a pair of parallax images can be obtained by capturing the subject images through the two apertures disposed apart.

Figure 3:
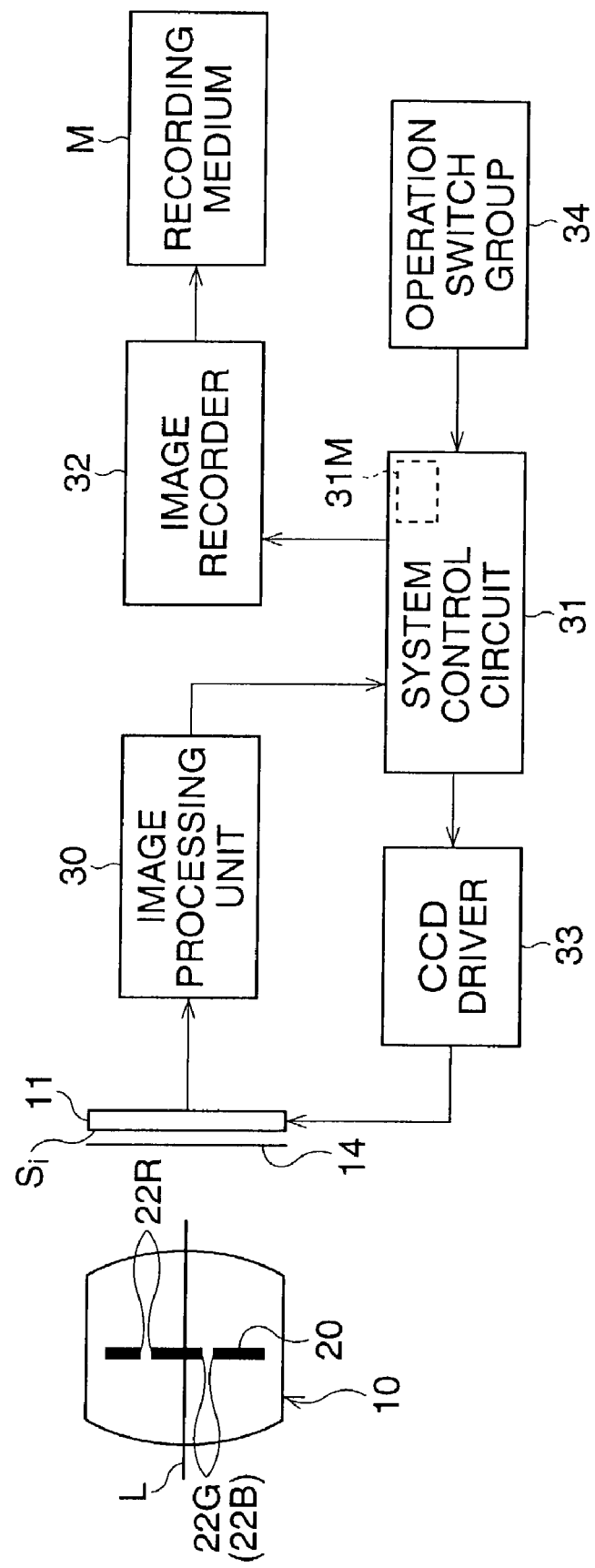
FIG. 3 is a block diagram showing the electrical construction of the stereo-image capturing device of the first embodiment.
Figure 4:
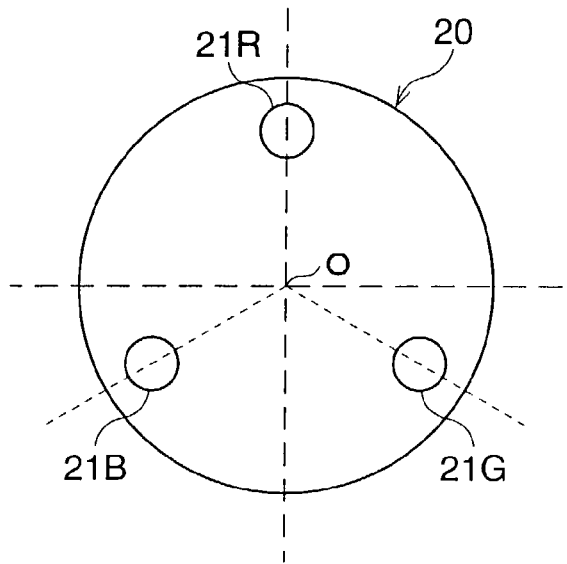
FIG. 4 schematically illustrates the construction of an aperture member applied in the first embodiment.

With reference to FIG. 3 and FIG. 4, a stereo-image capturing device for the first embodiment of the present invention will be described in the following. FIG. 3 is a block diagram showing the electrical construction of the stereo-image capturing device of the first embodiment. FIG. 4 schematically illustrates the construction of the aperture member applied in the first embodiment. Note that, the members which are common to the members in FIG. 1 and FIG. 2 will be referred to by the same references.

The aperture disk (aperture member) 20, which is mounted in the photographing optical system, is formed into a circular disk of which size is approximately identical to the pupil of the photographing optical system, for example. The center O of the aperture disk 20 substantially coincides with the optical axis L and the disk surface is substantially perpendicular to the optical axis L. On the aperture disk 20, three apertures 21R, 21G, and 21B are formed within the pupil of the photographing optical system, so that the apertures 21R, 21G, and 21B are within the incident luminous flux. The respective apertures 21R, 21G, and 21B are fitted with optical filters which selectively transmit the light in the red (R), green (G), and blue (B) spectrums. Namely, red light passes through the only aperture 21R, green light passes through the only aperture 21G, and blue light passes through the only aperture 21B, so that the apertures 21R, 21G, and 21B stop down R, G, and B light beams, respectively. For example, the apertures 21R, 21G, and 21B are circular openings and arranged near the peripheral edge of the aperture disk 20 at regular distances from the center O. Namely, the aperture 21R, 21G, and 21B are disposed as far apart from the optical axis L as possible but within the pupil of the photographing optical system (i.e., within the circular disk 20). Further, the apertures 21R, 21G, and 21B are arranged at equal intervals along the periphery of the aperture disk 20. Namely, in the first embodiment, the apertures 21R, 21G, and 21B are arranged at the vertexes of a regular triangle of which center is positioned at the center O of the aperture disk 20, which coincides with the optical axis L. Note that, in the present embodiment, the aperture disk 20 is arranged so that the segment between the centers of the aperture 21G and 21B is parallel with the horizontal line of the imaging device 11. Consequently, for a pair of parallax images obtained through the aperture 21G and 21B, epipolar lines in each of the parallax images approximately coincide with each other, thus determining correspondence between the parallax images becomes easy. Note that, in the present embodiment, a side of the (regular) triangle which is comprised of the aperture 21R, 21G, and 21B is arranged parallel to the horizontal line of the imaging device 11, the side can be arranged parallel to the vertical line of the imaging device 11. With this arrangement, a similar advantage, i.e., easy determination of the correspondence between the parallax images, is obtained.

Light beams from the subject which are made incident to the photographing lens system 10 are projected to the imaging surface $S_i$ of the imaging device 11 through one of the aperture 21R, 21G, and 21B, so that the subject images are produced. Since the apertures 21R, 21G, and 21B are arranged apart, the R, G, and B color images of the subject (which are produced of the respective R, G, and B light beams projected to the imaging surface $S_i$ of the imaging device 11 through the aperture 21R, 21G, and 21B) are produced as the parallax images, as explained with reference to FIGS. 1 and 2. Namely, on the imaging surface $S_i$ of the imaging device 11, three parallax images of R, G, and B colors are projected simultaneously.

In the present embodiment, for example, a CCD with the RGB on-chip color filter 14 attached is utilized for the imaging device 11. Namely, the color filters which are applied to the apertures 21R, 21G, and 21B correspond to the color filters which are utilized for the imaging device 11, so that the R, G, and B color subject images formed on the imaging surface $S_i$ via the apertures 21R, 21G, and 21B are sensed at the pixels with the R, G, and B color filters respectively, as the R, G, and B color images. Note that, in the present embodiment, although an image capturing operation for the R, G, and B color images is carried out by an electronic shuttering operation of the CCD, a mechanical shutter may be used for the operation.

Image signals which are detected in the imaging device (CCD) 11 are fed to the image processing unit 30, so that the signals are converted from analog signals to digital signals and then subjected to predetermined signal processing. The image signals are then temporally stored in the memory 31M of the system control circuit 31 as RGB image data. The system control circuit 31 generally controls the stereo-image capturing device. The RGB image data stored in the memory 31M of the system control circuit 31 may be recorded in the recording medium M via the image recorder 32. Further, the CCD 11 is controlled by the CCD driver 33 and the CCD driver 33 is controlled by the system control circuit 31. An image capturing operation of the stereo-image capturing device and an image data recording operation for the recording medium M are controlled in accordance with the operations at the operation switch group 34, which is comprised of a release switch and other switches (not shown).

Figure 5:
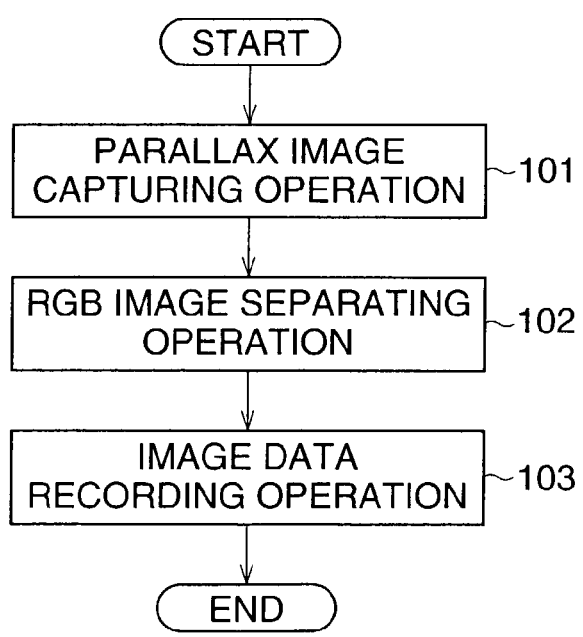
FIG. 5 is a flow chart showing the process for capturing the parallax images.

FIG. 5 is a flow chart showing the process for capturing the parallax images. When the release switch of the operation switch group 34 is depressed, the process in Step 101 starts. In Step 101, the CCD 11 is driven in the same way for normal still video capturing so that the R, G, and B images of the subject are obtained. However, in the present embodiment, the R, G, and B color images of the subject are projected through the apertures 21R, 21G, and 21B, so that the R, G, and B color images of the subject are projected as three different images with parallax, i.e., parallax images. The R, G, and B color parallax images are sensed simultaneously at the pixels with the R, G, and B color filters, respectively. In Step 102, the RGB image data obtained by the CCD 11 is separated to R, G, and B color components and data for the R image, G image, and B image are produced. In Step 103, the image data for each of the R, G, and B color components are recorded on the nonvolatile recording medium M. By this the process for the stereo-image capturing operation is terminated. Note that, from the R, G, and B image data of the three parallax images detected in the above operation, a stereo vision can be obtained in accordance with the conventional stereoscopic principle. Further, from the R, G, and B image data, a single color image can be obtained.

As described above, according to the first embodiment, three parallax images are captured simultaneously with a single image capturing operation, so that a stereo-image for a moving subject can be obtained with the single lens system. Further, since the device in the first embodiment does not require a mechanism for displacing an aperture, the embodiment has an advantage of easy miniaturization and low cost production. Furthermore, in the first embodiment, since the apertures 21R, 21G, and 21B are arranged at the vertexes of a regular triangle with its center O at the optical axis L, a long distance between the each aperture 21R, 21G, and 21B is available. Consequently, images with large parallax is obtained.

Figure 6:
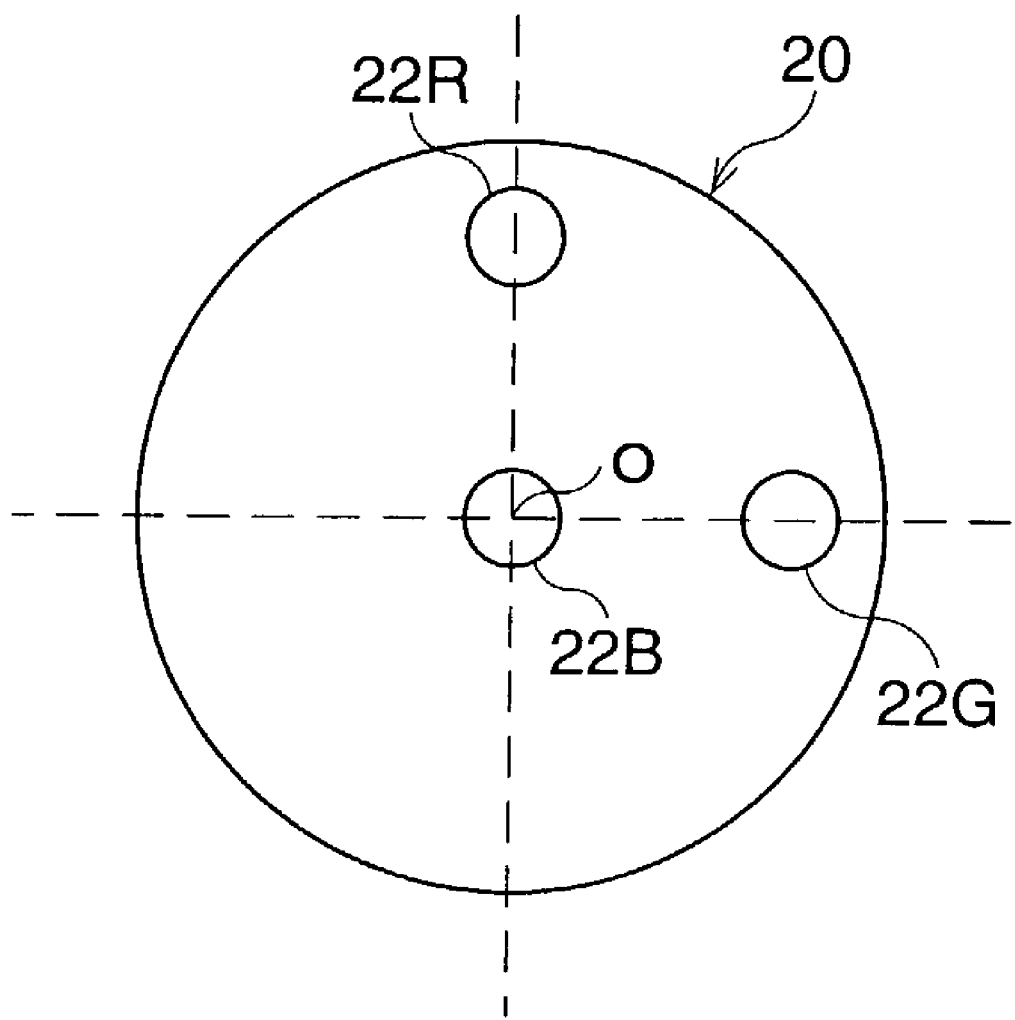
FIG. 6 schematically illustrates the construction of an aperture member applied in the second embodiment.

With reference to FIG. 6, the second embodiment of the present invention will be explained. The second embodiment is similar to the first embodiment except for the arrangement of the apertures formed on the aperture disk 20. Therefore, the part dissimilar to the first embodiment will be described in the following.

FIG. 6 schematically illustrates the construction of the aperture disk (aperture member) applied in the second embodiment. In the second embodiment, the arrangement of the apertures 22R, 22G, and 22B, with the R, G, and B color filters, is the only thing dissimilar to the first embodiment. In the second embodiment, the center of the aperture 22B is disposed at the center O of the aperture disk 20, which coincides with the optical axis L. The apertures 22R and 22G are arranged at the regions near the periphery of the aperture disk 20, on the segments on the surface of the aperture disk 20 which crosses at right angles at the center O of the aperture disk 20. Further, these segments are arranged parallel to the horizontal line and vertical line of the CCD 11. Namely, the segment between the apertures 22R and 22B and the segment between the apertures 22G and 22B cross at right angles, and are parallel to the vertical and horizontal line of the CCD 11, respectively.

As discussed above, according to the second embodiment which utilizes the apertures 22R, 22G, and 22B, a similar effect as that in the first embodiment can be obtained. Further, in the second embodiment, the segment between the apertures 22R and 22B and the segment between the apertures 22G and 22B cross at right angles and are parallel to the vertical and horizontal line of the CCD 11, respectively. Therefore, epipolar lines in the parallax images obtained by the apertures 22R and 22B approximately coincide with each other, and the epipolar lines in the parallax images obtained by the apertures 22G and 22B approximately coincide with each other. As the result, the correspondence between the two images become much easier than the first embodiment.

Note that, in the present embodiments, R, G, and B color filters are fitted to the three apertures since the CCD is attached with the RGB on-chip color filters, however, color filters for the apertures are not restricted to R, G, and B colors. Any colors can be used for the color filters of the apertures as long as the colors correspond to the colors of the filters for the CCD. The number of the filter colors is also not restricted to three colors. It may be more or less than three. Further, the arrangement of the apertures is not restricted to those in the first and second embodiments, so that the arrangement can be changed as to the design requirement.

In the present embodiments, although the optical filters for the apertures selectively transmits the light in the range of the visible rays, the transmitting ranges for the filters are not restricted to the visible spectrum. The ranges outside the invisible spectrum, such as the infrared spectrum or ultraviolet spectrum may be applied to the transmitting ranges of the optical filters for the apertures.

Further, in the present embodiments, although a single CCD with an on-chip color filter is used for the imaging device to capture parallax images, three monochrome CCDs and a dichroic mirror may be used for the parallax images capturing. Furthermore, the form and size of the aperture disk may be altered as to the design request and is not restricted to the circular disk.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-150366 (filed on May 21, 2001) which is expressly incorporated herein, by reference, in its entirety.

What is claimed is:

1. A stereo-image capturing device, comprising:
an image-sensing system that is configured to sense a first subject image produced by light beams in a first spectrum, a second subject image produced by light beams in a second spectrum, and a third subject image produced by light beams in a third spectrum;
a photographing optical system that produces said first, second, and third subject images in said image-sensing system; and
an aperture member that comprises first, second, and third apertures;
said first aperture is fitted with a first optical filter which selectively transmits light beams of said first spectrum, said second aperture is fitted with a second optical filter which selectively transmits light beams of said second spectrum, and said third aperture is fitted with a third optical filter which selectively transmits light beams of said third spectrum;
wherein a segment between said first and second apertures is parallel to a direction of one of a horizontal line and a vertical line of said image-sensing system and a segment between said second and third apertures is parallel to a direction of a remaining one of the horizontal line and the vertical line of said image-sensing system and wherein parallax images projected through said first, second, and third apertures are simultaneously formed on the image-sensing system.

2. The device according to claim 1, wherein said first, second, and third apertures are arranged on a plane perpendicular to the optical axis of said photographing optical system.

3. The device according to claim 1, wherein said image-sensing system comprises an imaging device with an on-chip color filter and said on-chip color filter comprises said first, second, and third optical filters.

4. The device according to claim 1, wherein said first, second, and third spectrums each correspond to a different one of red, green, and blue spectrums.

5. The device according to claim 4, wherein said first, second apertures and a third aperture are arranged on a plane perpendicular to an optical axis of said photographing optical system and said first, second, and third apertures correspond to vertexes of a triangle.

6. A stereo-image capturing device, comprising:
an image-sensing system that is configured to sense a first subject image produced by light beams in a first spectrum, a second subject image produced by light beams in a second spectrum and a third subject image produced by light beams in a third spectrum;
a photographing optical system that produces said first, second, and third subject images in said image-sensing system; and
an aperture member that comprises first, second, and third apertures;
said first aperture is fitted with a first optical filter which selectively transmits light beams of said first spectrum, said second aperture is fitted with a second optical filter which selectively transmits light beams of said second spectrum, and said third aperture is fitted with a third optical filter which selectively transmits light beams of said third spectrum;
said first, second and third apertures are arranged on a plane perpendicular to an optical axis of said photographing optical system and said first, second, and third apertures correspond to vertexes of a triangle having a center that coincides with said optical axis;
wherein a segment between said first and second apertures is parallel to one of a horizontal line and a vertical line of said image-sensing system and wherein parallax images projected through said first, second, and third apertures are simultaneously formed on the image-sensing system.

7. The device according to claim 6, wherein said image-sensing system comprises an imaging device with an on-chip color filter and said on-chip color filter comprises said first, second, and third optical filters.

8. The device according to claim 6, wherein said first, second, and third spectrums each correspond to a different one of a red spectrum, a green spectrum, and a blue spectrum.

9. The device according to claim 1, wherein a center of said aperture member coincides with an optical axis of the photographing optical system.

10. The device according to claim 6, wherein a center of said aperture member coincides with said optical axis.

11. The device according to claim 1, wherein each of said first, second, and third apertures correspond to a spectrum comprising only a single color spectrum.

12. The device according to claim 6, wherein each of said first, second, and third apertures correspond to a spectrum comprising only to a single color spectrum.

13. The device according to claim 1, wherein a center of one of said first, second, and third apertures coincides with an optical axis of said photographing optical system.

* * * * *